United States Patent [19]

Ufrecht

[11] Patent Number: 5,743,588
[45] Date of Patent: Apr. 28, 1998

[54] METALLIC SECTION AS REINFORCEMENT OF A MOTOR VEHICLE DOOR

[75] Inventor: Martin Ufrecht, Machabaeerstrasse, Germany

[73] Assignee: Ford Global Technologies, Inc., Dearborn, Mich.

[21] Appl. No.: 960,542

[22] Filed: Oct. 31, 1997

Related U.S. Application Data

[63] Continuation of Ser. No. 493,729, Jun. 22, 1995, abandoned.

[30] Foreign Application Priority Data

Jun. 23, 1994 [DE] Germany ............... 44 21 934.2

[51] Int. Cl.[6] ...................................... B60J 5/04
[52] U.S. Cl. ............................................... 296/146.6
[58] Field of Search ................................. 296/146.6

[56] References Cited

U.S. PATENT DOCUMENTS

| | | | |
|---|---|---|---|
| 4,013,317 | 3/1977 | Reidelbach et al. | 296/146.6 |
| 4,090,734 | 5/1978 | Inami et al. | 296/146.6 |
| 5,232,261 | 8/1993 | Kuroda et al. | 296/146.4 |
| 5,306,068 | 4/1994 | Nakae et al. | 296/146.6 |

FOREIGN PATENT DOCUMENTS

| | | | |
|---|---|---|---|
| 402070522 A | 3/1990 | Japan | 296/146.6 |
| 402114019 A | 4/1990 | Japan | 296/146.6 |
| 404183635 A | 6/1992 | Japan | 296/146.6 |

*Primary Examiner*—Gary C. Hoge
*Attorney, Agent, or Firm*—Daniel M. Stock

[57] ABSTRACT

In a metallic section as reinforcement for a motor vehicle door which can be fixed to the vehicle door (at 3) by both ends, at least one end having a flat bearing surface and an open cross-section along an axially extending flat slope (15) and being brought to the finished length for installation by oblique forming to length of a continuous starting material made by section rolling, the section is made by section rolling a continuous starting material, namely, by cold rolling steel sheet (8) having a corrosion resistant coating on at least one side and the oblique forming to length is performed by crop cutting or laser beam cutting along a flat or angled oblique cut (15).

4 Claims, 4 Drawing Sheets

METALLIC SECTION AS REINFORCEMENT OF A MOTOR VEHICLE DOOR

This application is a continuation of application Ser. No. 08/493,729, filed Jun. 22, 1995, now abandoned.

BACKGROUND OF THE INVENTION

1. Field of the Invention

The invention relates to the reinforcement of a motor vehicle door through use of an improved metallic cross-section.

2. Description of the Prior Art

From German Utility Model 92 13 150, a design for a steel intrusion beam is known in which the beam is made by hot rolling from a continuous starting material and is formed as a box section and is provided with a flat mounting surface (3) at its ends and an open cross-section by forming it obliquely to length by crop cutting or by laser beam cutting.

The known intrusion beam has the disadvantage that because it is made by hot rolling, it has no corrosion resisting treatment on the interior of the hollow beam. This requires that suitable measures be taken for corrosion protection either in advance in a special manufacturing step or after the impact beam has been installed in the vehicle.

From German Utility Model 92 08 957, a door reinforcement is known which provides hollow cross-sections of various shapes. The reinforcement likewise is produced by hot rolling from a continuous starting material. This invention does not teach the formation of the ends of the reinforcing beam or the protection of the beam from corrosion.

From German patent 40 31 683, a hollow metallic section is shown to include a door reinforcement member which is made from a continuous starting material in the form of a tube and whose ends are provided with flat bearing surfaces by bending the tube open.

No teaching is provided regarding the providing to such a narrow tube any corrosion protection.

From German patent 36 06 024, a motor vehicle door with an intrusion beam is known in which the starting point is a continuous hollow aluminium section made by extrusion, whose ends are provided with a flat bearing surface and an open cross-section by forming it obliquely to length by crop cutting or the like. Because of the use of aluminum, no anticorrosion coatings are provided with this prior art beam.

SUMMARY OF THE INVENTION

It is an object of the invention to produce a metallic section as reinforcement for a motor vehicle door by a simple process by which a very wide variety of section shapes can be obtained and in which adequate internal corrosion protection can be achieved directly and without the need for aftertreatment.

To this end, according to the invention, in making a metallic section as reinforcement for a motor vehicle door which can be fixed to the vehicle door by both ends, a section is provided in which at least one end has a flat bearing surface and an open cross-section along an axially extending flat slope and which is brought to the finished length for installation by forming obliquely to length from a continuous starting material made by section rolling. The section is made by cold rolling steel sheet having a corrosion resistant coating on at least one side and is brought to the length for installation by forming it obliquely to length by crop cutting or laser beam cutting along a flat or angled oblique cut.

Making the metallic section by cold rolling steel sheet having a corrosion resistant coating on at least one side and bringing it to the installation length by forming obliquely to length provides for simple manufacture and simple installation without the need for additional processing steps.

Advantageously, the oblique forming to length is effected by an angled oblique cut whereby a fixing tongue is formed.

The metallic section may be formed as a folded section, one limb of which is preferably kept flat while the other limb has channel sections which, together with the flat limb to which they are joined in the adjacent regions by spot welding or the like, form hollow sections.

Alternatively, the channel sections may be folded so as to be directly adjacent to one another so that in the final state the section has an M- or W-shaped cross-section.

DESCRIPTION OF PREFERRED EMBODIMENTS

Figure 1:
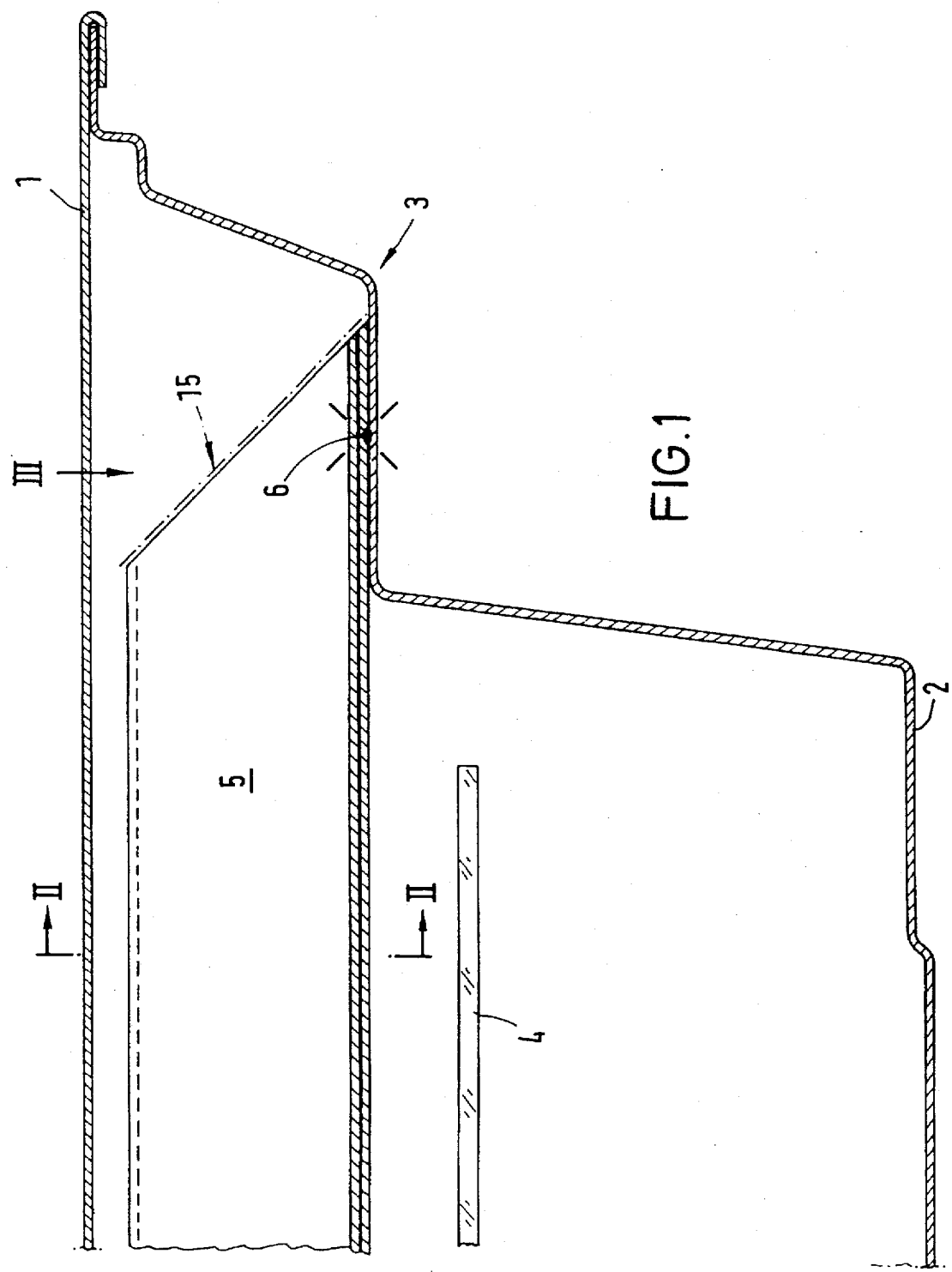
FIG. 1 shows a partial horizontal section through a motor vehicle door in the region where the interior reinforcement is attached.
Figure 2:
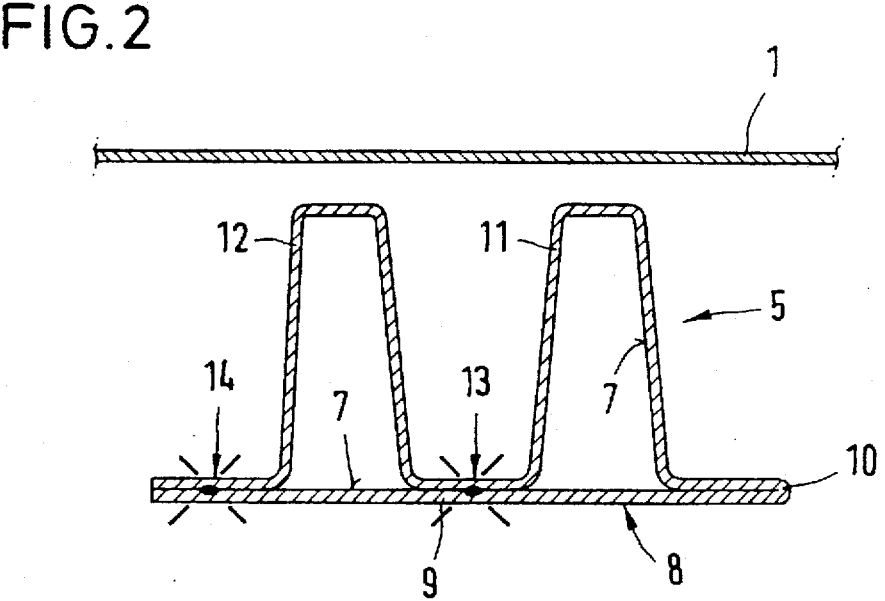
FIG. 2 is a section along the line II—II in FIG. 1.
Figure 3:
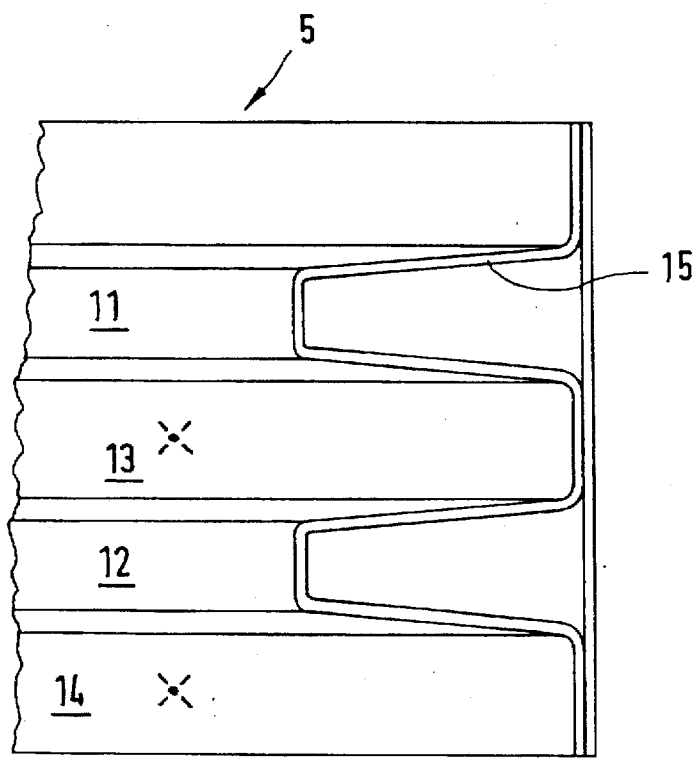
FIG. 3 is a view in the direction of the arrow III in FIG. 1.

In the embodiment shown in FIGS. 1 to 3, a motor vehicle door consists essentially of an outer door panel 1 and an inner door panel 2. A step region 3 outside the plane of the window glass 4 is provided for the attachment of a reinforcement 5 by means of spot welds 6 or other fastening means. The section or reinforcement 5 is made by cold rolling of a steel sheet 8 having a corrosion resisting coating at 7 on at least one side, the starting point for this embodiment being a flat limb 9 of the section 5 which is folded over at 10 so that the channel sections 11 and 12 form, with the flat limb 9, a section having two trapezoidal chambers, the adjacent regions being joined together at 13 and 14, for example by spot welding or laser beam welding.

As can be seen from FIGS. 1 and 3, the section 5 is opened by forming it obliquely to length by crop cutting or laser beam cutting in the form of a flat oblique cut 15 (as indicated by the dotted line) so that in the step region 3, fixing by simple means, e.g., by spot welds 6 made with spot welding tongs, is possible.

Figure 4:
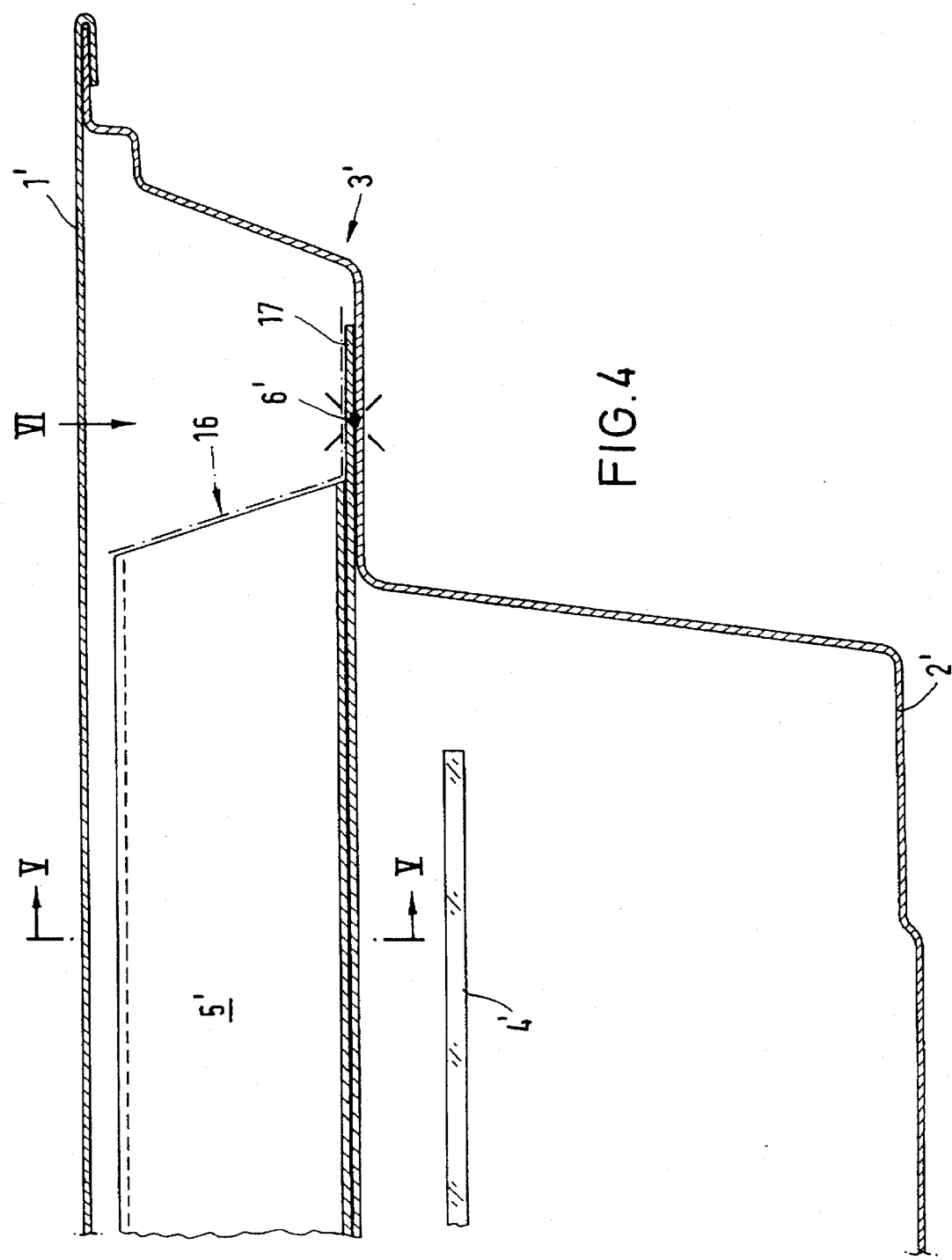
FIG. 4 is a horizontal partial section through a motor vehicle door in the region of the reinforcement.
Figure 5:
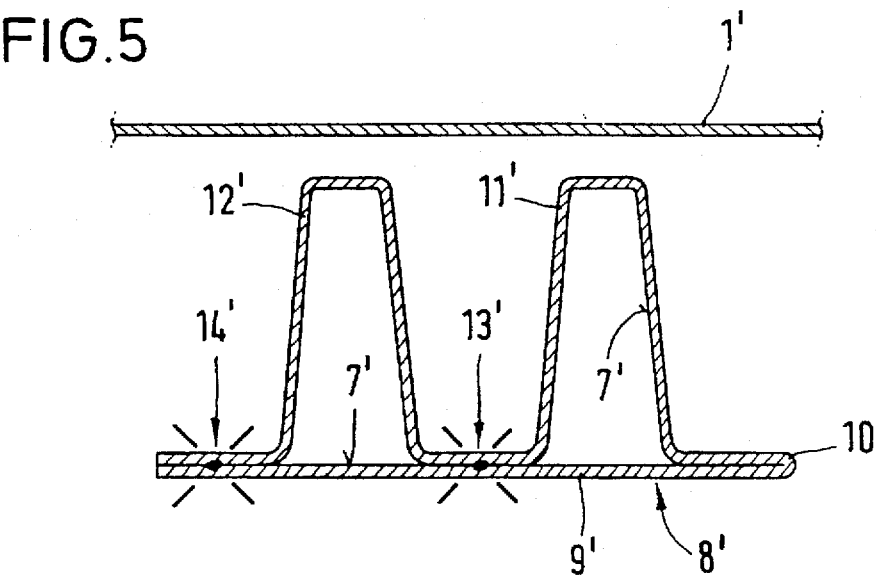
FIG. 5 is a section along the line V—V in FIG. 4.
Figure 6:
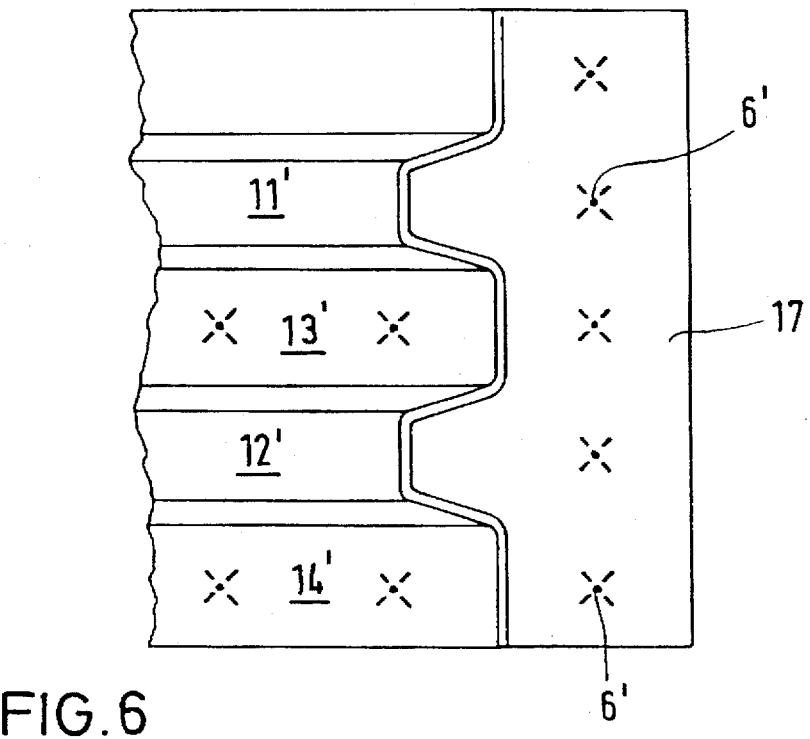
FIG. 6 is a view in the direction of the arrow VI in FIG. 4.

In the embodiment shown in FIGS. 4 to 6, the parts are substantially the same and are only distinguished by a dash.

The structure of the section 5' substantially corresponds to that of the section shown in FIGS. 1 to 3, the only difference being a different type of forming obliquely to length by crop cutting or laser beam cutting, namely, by an angled oblique cut 16 (see the chain line), which results in the flat limb 9' remaining in the form of a tongue 17. The reinforcement can therefore again be fixed in the usual way by spot welds 6' made with conventional spot welding tongs.

The section as reinforcement of a motor vehicle door can, of course, have any of the section shapes that have already been disclosed in the prior art referred to above, and, in addition, one can think of section shapes in which the channel sections do not form an open cross-section but are folded next to one another and therefore form, e.g., an M-shaped or a W-shaped section, which cannot be said to be a hollow section.

By means of the measures specified according to the invention, of making a section as reinforcement of a motor vehicle door from a steel sheet having a corrosion resistant coating on at least one side by cold rolling, the need for additional measures which are otherwise required for corrosion protection in the case of narrow hollow sections is avoided. Of course, instead of a steel sheet having a corrosion resistant coating on one side, a steel sheet coated on both sides can be used, and it is likewise possible, within the scope of the invention, to use coil-coated sheet or aluminium sheet for the corresponding cold rolling.

I claim:

1. An elongated metallic beam section for reinforcing a motor vehicle door, the section having two ends and being engagable with the vehicle door;

the metallic beam section having a flat bearing surface for attachment to the vehicle door and defining a hollow cross section terminating at an axially extending flat slope at at least one end;

the metallic beam section being formed from cold rolled steel having a corrosion resistant coating on at least one side and having a snot weld formed adjacent to the flat bearing surface within the hollow section defined at the at least one end flat slope for securing the metallic beam section to the door.

2. A metallic section according to claim 1, and further comprising a fixing tongue (17) projecting from the flat slope.

3. A metallic beam section according to claim 1 wherein the metallic beam section comprises a folded section having one flat limb and another limb having channel sections joined to the flat limb to form hollow sections.

4. A section according to claim 3, characterized in that the channel sections are folded so as to be directly adjacent to one another so that in the final state the section has an M- or W-shaped cross-section.

* * * * *